United States Patent [19]

Ito

[11] Patent Number: 4,772,087
[45] Date of Patent: Sep. 20, 1988

[54] PUSHER DEVICE FOR PLASTIC OPTICAL FIBER

[75] Inventor: Eiji Ito, Furukawa, Japan

[73] Assignee: Alps Electric Co., Ltd., Japan

[21] Appl. No.: 923,301

[22] Filed: Oct. 27, 1986

[30] Foreign Application Priority Data

Oct. 31, 1985 [JP] Japan .................................. 60-166731

[51] Int. Cl.$^4$ ............................................... G02B 6/36
[52] U.S. Cl. .................................................. 350/96.20
[58] Field of Search ................ 350/96.10, 96.20, 96.21

[56] References Cited

U.S. PATENT DOCUMENTS 4,427,879  1/1984  Bechev et al. .................... 350/96.20

*Primary Examiner*—Gene Wan
*Attorney, Agent, or Firm*—Guy W. Shoup; Glenn Ostrager; Leighton K. Chong

[57] ABSTRACT

Disclosed herein is a pusher device for a plastic optical fiber comprising a pair of pusher members for holding and fixing end portions of plural plastic optical fibers covered with sheaths, and a plurality of channel-like pushing portions provided on at least one of said pair of pusher members in such a manner as to correspond to said plural plastic optical fibers, said channel-like pushing portions having inner wall surfaces to be in press-contact with said sheaths. With this arrangement a contact area between the pusher members and the sheaths is increased to prevent slip of the optical fibers relative to the sheaths and maintain good light transmittance.

7 Claims, 4 Drawing Sheets

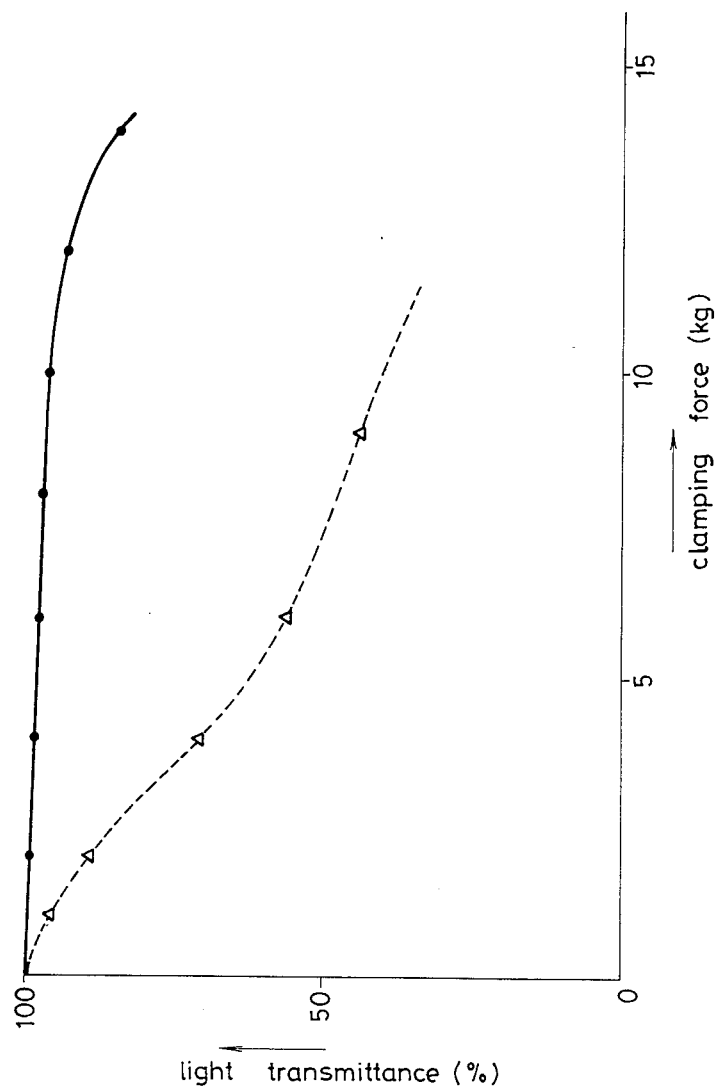

PUSHER DEVICE FOR PLASTIC OPTICAL FIBER

BACKGROUND OF THE INVENTION

The present invention relates to a pusher device for positioning the ends of plastic optical fibers, and more particularly to a pusher device employable for a multiple-core optical fiber cable incorporating plural plastic optical fibers.

FIGS. 8 and 9 show a pusher device employed for a dual-core optical fiber cable in the prior art. As shown in FIGS. 8 and 9, an optical fiber cable 1 is constituted of two plastic optical fibers 2 and 3 having different flows, sheaths 4 and 5 made of polyethylene, etc. for covering the respective optical fibers 2 and 3, and an outer cover 6 made of polyvinylchloride, etc. for generally covering the sheaths 4 and 5. The sheaths 4 and 5 are exposed at the end portion of the optical fiber cable 1, and are held by a pair of pusher members 8 and 9 of a pusher device 7 to position the ends of the optical fibers 2 and 3. The optical fibers 2 and 3 are projected from the end surfaces of the sheaths 4 and 5 at a predetermined amount. The end surfaces 2a and 3a of the optical fibers 2 and 3 are arranged in opposed relation with an optical connector (not shown) so as to transmit an optical signal.

As shown in FIG. 8, the conventional pusher device 7 is designed so that the two sheaths 4 and 5 are sandwiched between opposed flat surfaces 8a and 9a of the pair of pusher members 8 and 9, and are held by applying a clamping force thereto in the direction of an arrow shown in FIG. 9, thereby enhancing a frictional force between the optical fiber 2 and the sheath 4 and a fricitional force between the optical fiber 3 and the sheath 5, and preventing slippage of the end surfaces 2a and 3a of the optical fibers 2 and 3.

However, in the aforementioned pushed device 7 having the structure that the sheaths 4 and 5 are held by the flat surfaces 8a and 9a of the pair of pusher members 8 and 9, slip of the optical fibers 2 and 3 relative to the sheaths 4 and 5 has not been securely prevented unless the clamping force of the pusher members 8 and 9 is much great. If the clamping force of the pusher members 8 and 9 is increased so as to securely prevent the slip of the optical fibers 2 and 3, there will be generated local stress concentration to remarkably reduce light transmittance of the optical fibers 2 and 3. As a result, the conventional pusher device 7 has not securely prevented the slip of the optical fibers 2 and 3 without reducing the light transmittance too much. Under the condition where the end portions of the optical fibers 2 and 3 are liable to slip in the respective sheaths 4 and 5, when the optical fiber cable 1 is bent near the end portion thereof as shown in FIG. 9, the end surfaces 2a and 3a of both the optical fibers 2 and 3 are slipped from a predetermined position because of difference in curvature. For example, the end surface 2a of the optical fiber 2 on the side of smaller curvature in FIG. 9 is projected from the predetermined position, and is brought into abutment against the optical connector (not shown) to cause a serious accident such as damage of the end surfaces.

SUMMARY OF THE INVENTION

Accordingly, it is an object of the present invention to provide a pusher device for a plastic optical fiber which may securely prevent slip of the plural plastic optical fibers relative to the sheaths and maintain good light transmittance.

According to the present invention, there is provided a pusher device for a plastic optical fiber comprising a pair of pusher members for holding and fixing end portions of plural plastic optical fibers covered with sheaths, and a plurality of channel-like pushing portion provided on at least one of said pair of pusher members in such a manner as to correspond to said plural plastic optical fibers, said channel-like pushing portions having inner wall surfaces to be in press-contact with said sheaths.

With this arrangement, a contact area between the pusher members and the sheaths is increased, and accordingly local stress concentration is hardly generated in the optical fibers to thereby maintain good light transmittance. Moreover, a frictional force between the optical fibers and the sheaths covering the same may be sufficiently enhanced without excessively increasing the clamping force of the pusher members to thereby securely prevent slip of the optical fibers.

Other objects and features of the invention will be more fully understood from the following detailed description and appended claims when taken with the accompaning drawings.

BRIEF DESCRIPTION OF THE DRAWINGS

FIG. 2 is a characteristics graph illustrating the relation between a clamping force of the pusher members and light transmittance in comparison with the prior art;

DETAILED DESCRIPTION OF THE PREFERRED EMBODIMENTS

Figure 1:
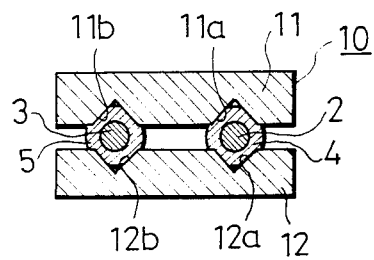
FIG. 1 is a sectional view of an essential part of a first preferred embodiment according to the present invention.
Figure 8:
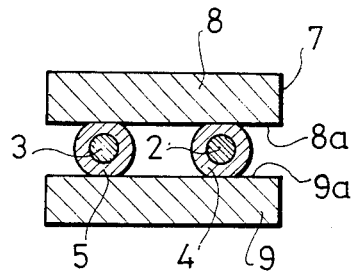
FIG. 8 is a sectional view of a pusher device in the prior art.
Figure 9:
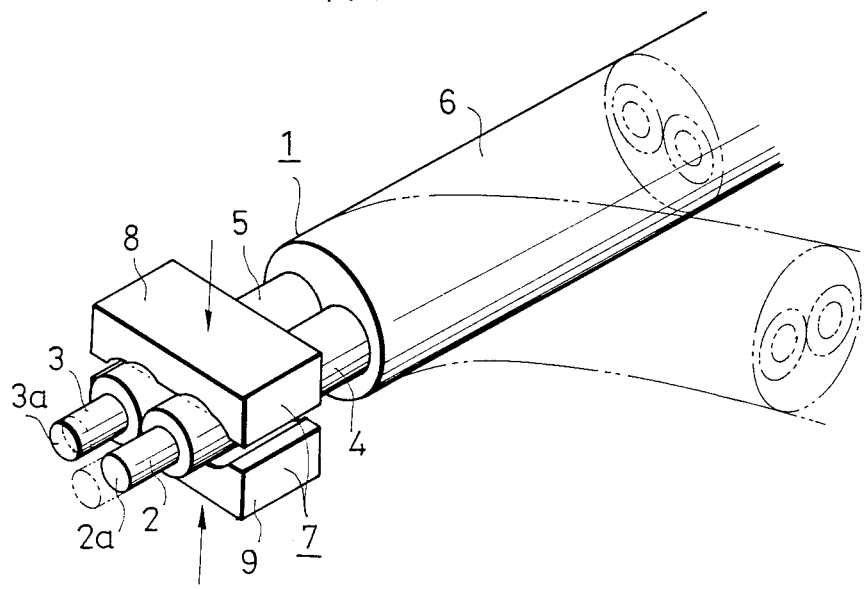
FIG. 9 is a perspective view of the pusher device in the prior art.

Referring to FIG. 1 which shows a first preferred embodiment of the present invention, a pusher device 10 is constituted of a pair of pusher members 11 and 12. Like parts as in FIGS. 8 and 9 are designated by the same reference numerals.

As shown in FIG. 1, the pair of pusher members 11 and 12 of the pusher device 10 are provided with each two channel-like pushing portions 11a, 11b and 12a, 12b corresponding to two optical fibers 2 and 3, respectively. Each of the channel-like pushing portions 11a, 11b, 12a and 12b is defined by two flat surfaces forming a sectionally triangular channel. The sheath 4 covering the optical fiber 2 is in press-contact with four inner wall surfaces forming the channel-like pushing portions 11a and 12a, and is sandwiched by the pusher members 11 and 12. In this manner, a contact area between the pusher members 11 and the sheath 4 is large, and accordingly, stress of the optical fiber 2 covered with the sheath 4 may be dispersed to effectively prevent slip of the optical fiber 2. Similarly, the sheath 5 covering the optical fiber 3 is in press-contact with four inner wall surfaces forming the channel-like pushing portions 11b and 12b, and is sandwiched by the pusher members 11 and 12.

Referring to FIG. 2, solid line shows a characteristics graph in the preferred embodiment, while a dotted line shows a characteristics graph in the prior art. The abscissa represents a clamping force of the pusher members as applied to one sheath upon holding a part of the sheath in the length of 3 mm along the longitudinal direction. The ordinate represents light transmittance corresponding to the clamping force. As will be apparent in FIG. 2, the light transmittance is not so decreased with an increase in the clamping force in the preferred embodiment as compared with the prior art, since each of the sheaths is held in press-contact with the four inner wall surfaces of the channel-like pushing portions, and stress is dispersed more than the prior art. For example, when the clamping force is 8 kg, loss of the light transmittance is about 3% in the preferred embodiment. To the contrary, loss of the light transmittance in the prior art is 50% and more.

Further, the amount of slip of the optical fibers relative to the sheaths was tested by longitudinally pulling each of the optical fibers with the force of 5 kg for 10 seconds under the condition where the clamping force is set at 8 kg. As the test result, the amount of slip in the preferred embodiment was 1-2 mm, while the amount of slip in the prior art was 12-14 mm. This result means that the frictional force between the optical fibers and the sheaths is more enhanced in the preferred embodiment than the prior art to thereby remarkably prevent the slip of the optical fibers in case of the same clamping force.

Figure 3:
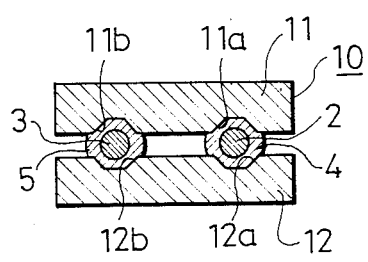
FIG. 3 is a sectional view similar to FIG. 1 in a second preferred embodiment according to the present invention.

Referring next to FIG. 3 which shows a second preferred embodiment of the present invention, each of the channel-like pushing portions 11a, 11b, 12a and 12b of the pair of pusher members 11 and 12 is defined by three flat surfaces forming a sectionally trapezoidal channel. The sheath 4 covering the optical fiber 2 is in press-contact with six inner wall surfaces forming the channel-like pushing portions 11a and 12a, and similarly the sheath 5 covering the optical fiber 3 is in press-contact with six inner wall surfaces forming the channel-like pushing portions 11b and 12b. Under the condition, both the sheaths 4 and 5 are sandwiched by the pusher members 11 and 12. In the second preferred embodiment, the contact area between the sheaths 4 and 5 and the pusher members 11 and 12 is larger than the first preferred embodiment.

Figure 4:
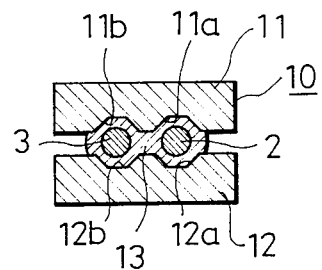
FIG. 4 is a sectional view similar to FIG. 1 in a third preferred embodiment according to the present invention.

Referring to FIG. 4 which shows a third preferred embodiment of the present invention, a sheath 13 is designed to generally covers both the optical fibers 2 and 3. The channel-like pushing portions 11a and 11b of the pusher member 11 are arranged in proximity to each other, and similarly the channel-like pushing portions 12a and 12b of the pusher member 12 are arranged in proximity to each other, so as to sandwich the sheath 13. The shape of the channel-like pushing portions 11a, 11b, 12a and 12b is similar to that in the second preferred embodiment.

Figure 5:
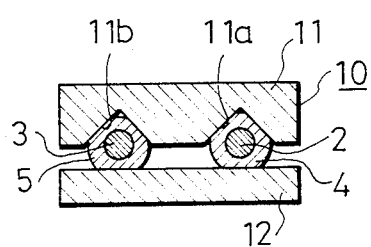
FIG. 5 is a sectional view similar to FIG. 1 in a fourth preferred embodiment according to the present invention.

Referring to FIG. 5 which shows a fourth preferred embodiment of the present invention, the pusher member 11 only is provided with the channel-like pushing portions 11a and 11b, and the pusher member 12 has a flat surface with no channel-like pushing portions. Even in the case that either of the pusher members 11 and 12 is provided with the channel-like pushing portions, the contact area between the sheaths 4 and 5 and the pusher members 11 and 12 is more widely increased than the prior art. The shape of the channel-like pushing portions 11a and 11b is similar to that in the first preferred embodiment.

Figure 6:
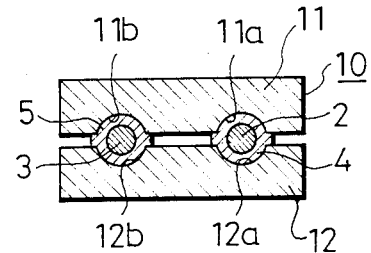
FIG. 6 is a sectional view similar to FIG. 1 in a fifth preferred embodiment according to the present invention.

Referring to FIG. 6 which shows a fifth preferred embodiment of the present invention, each of the channel-like pushing portions 11a, 11b, 12a and 12b of the pusher members 11 and 12 is defined by a cylindrical surface to greatly increase the contact area between the sheaths 4 and 5 and the pusher members 11 and 12.

Figure 7:
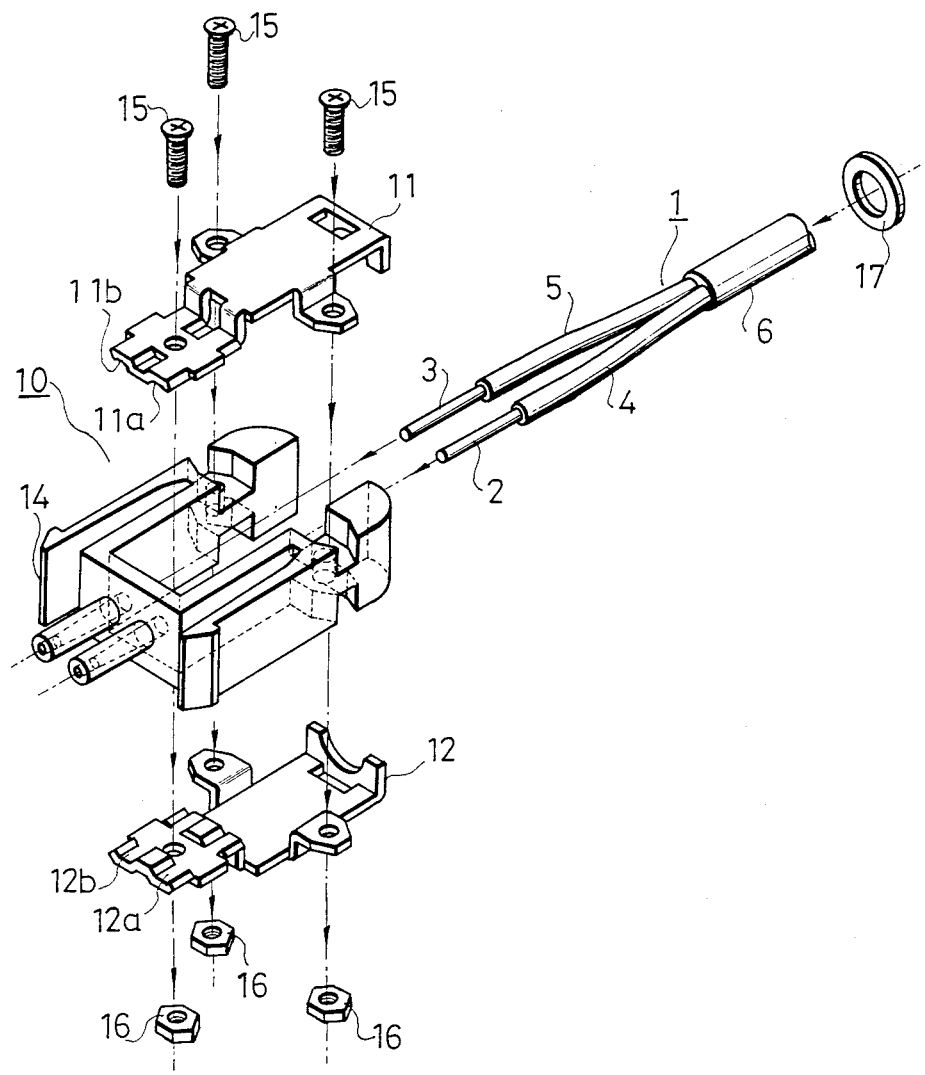
FIG. 7 is an exploded perspective view of a pusher device in a sixth preferred embodiment according to the present invention.

Referring to FIG. 7 which shows a sixth preferred embodiment of the present invention, there are provided a plug 14 made of synthetic resin, clamping screws 15 and clamping nuts 16. A pair of pusher members 11 and 12 formed of a metal plate are provided with the channel-like pushing portions 11a, 11b, 12a and 12b sandwiching the sheaths 4 and 5 made of polyethylene at the end portions thereof by means of the clamping screws 15 and the clamping nuts 16, and are fixed to the plug 14. An annular fixing member 17 made of metal is engaged with the end portion of an outer cover 6 made of polyvinylchloride which generally covers both the sheaths 4 and 5 of the optical fiber cable 1 so as to fix the sheaths 4 and 5 to the outer cover 6. The shape of the channel-like pushing portions 11a, 11b, 12a and 12b is similar to that in the second preferred embodiment.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a pusher device for holding a pair of optical fibers of an optical fiber cable in parallel alignment with a longitudinal axis, the optical fibers having covering sheaths made of a plastic material which are exposed from the optical fiber cable in a holding region of said pusher device, the improvement wherein said pusher device comprises a pair of opposing pusher members having respective holding surfaces facing each other which are clamped toward each other but spaced apart a slight distance from each other so as to allow pressure to be applied to said pusher members to hold the optical fibers covered in their sheaths therebetween in parallel alignment, each of said holding surfaces having formed therein a pair of channel-like pushing portions in which the respective optical fibers in their sheaths are held in close contact, said channel-like pushing portions being formed as a pair of spaced apart, separate grooves extending in parallel with said longitudinal axis and being recessed in said holding surface, each having an inner wall surface which is contoured in cross section corresponding partially to the cross section of the respective optical fibers in their sheaths, whereby the surface contact area of said pusher members with the optical fibers is increased, compared to the case where said holding surfaces are formed substantially flat, such that the holding pressure of said pusher members is more evenly distributed on the plastic sheaths of the optical fibers and slippage of or damage to the optical fibers is avoided.

2. The pusher device as defined in claim 8, wherein each of said channel-like pushing portions is defined by plural flat surfaces forming a sectionally angular channel.

3. The pusher device as defined in claim 8, wherein each of said channel-like pushing portions is defined by two flat surfaces forming a sectionally triangular channel.

4. The pusher device as defined in claim 8, wherein each of said channel-like pushing portions is defined by three flat surfaces forming a sectionally trapezoidal channel.

5. The pusher device as defined in claim 8, wherein each of said channel-like pushing portions is defined by a cylindrical surface.

6. The pusher device as defined in claim 8, wherein said channel-like pushing portions are arranged in proximity to each other to sandwich an integral sheath.

7. The pusher device as defined in claim 8, wherein said pusher device comprises a plug made of synthetic resin, clamping screws, clamping nuts, a pair of pusher members formed of a metal plate for holding said sheath by a predetermined clamping force of said clamping screws and said clamping nuts, said pusher members being fixed to said plug.

* * * * *

UNITED STATES PATENT AND TRADEMARK OFFICE
CERTIFICATE OF CORRECTION

PATENT NO. : 4,772,087

DATED : September 20, 1988

INVENTOR(S) : Eiji Ito

It is certified that error appears in the above-identified patent and that said Letters Patent is hereby corrected as shown below:

On the Title Page, Item [56],
In the References Cited, "Bechev" should read --Becher--.

Col. 5, line 8, "claim 8" should read --claim 1--.

Col. 5, line 12, "claim 8" should read --claim 1--.

Col. 5, line 16, "claim 8" should read --claim 1--.

Col. 6, line 3, "claim 8" should read --claim 1--.

Col. 6, line 6, "claim 8" should read --claim 1--.

Col. 6, line 9, "claim 8" should read --claim 1--.

Signed and Sealed this

Fourth Day of April, 1989

*Attest:*

*Attesting Officer*

DONALD J. QUIGG

*Commissioner of Patents and Trademarks*